April 18, 1961  D. J. SANDERS  2,980,054
AMPHIBIOUS VEHICLE
Filed Dec. 18, 1959  4 Sheets-Sheet 1
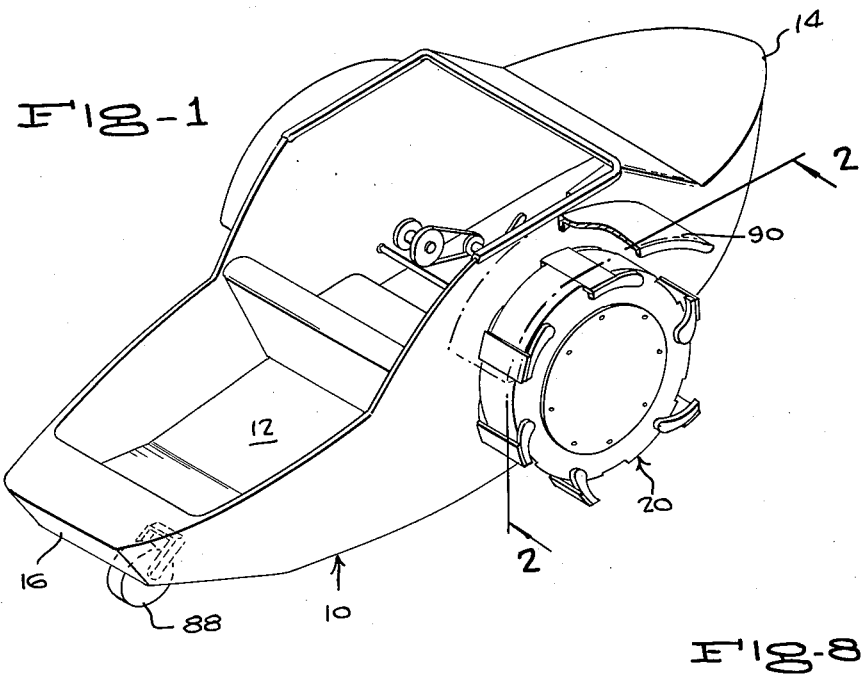
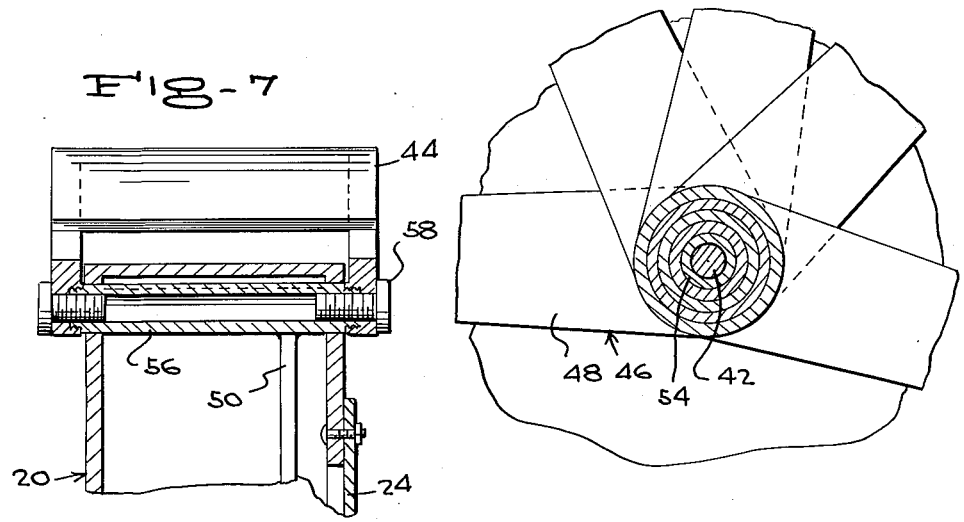
INVENTOR.
DEONARD J. SANDERS
BY
McMorrow, Berman & Davidson
ATTORNEYS

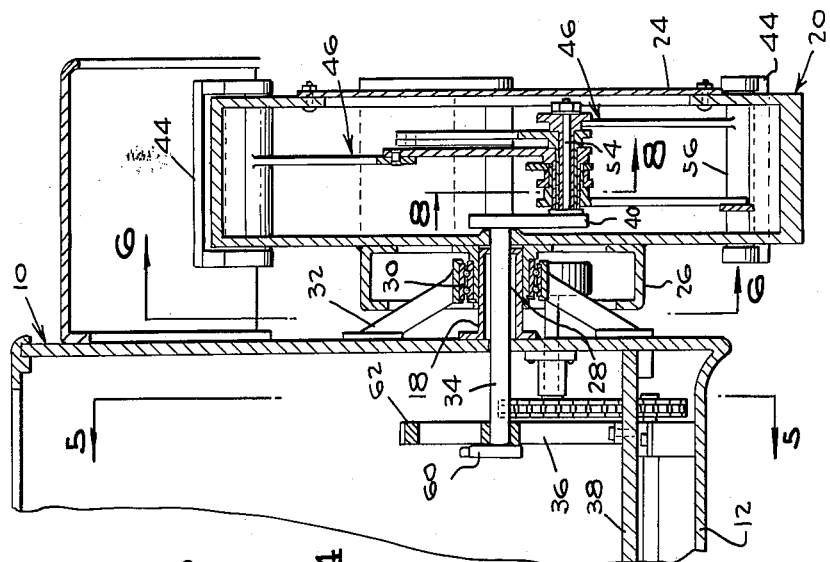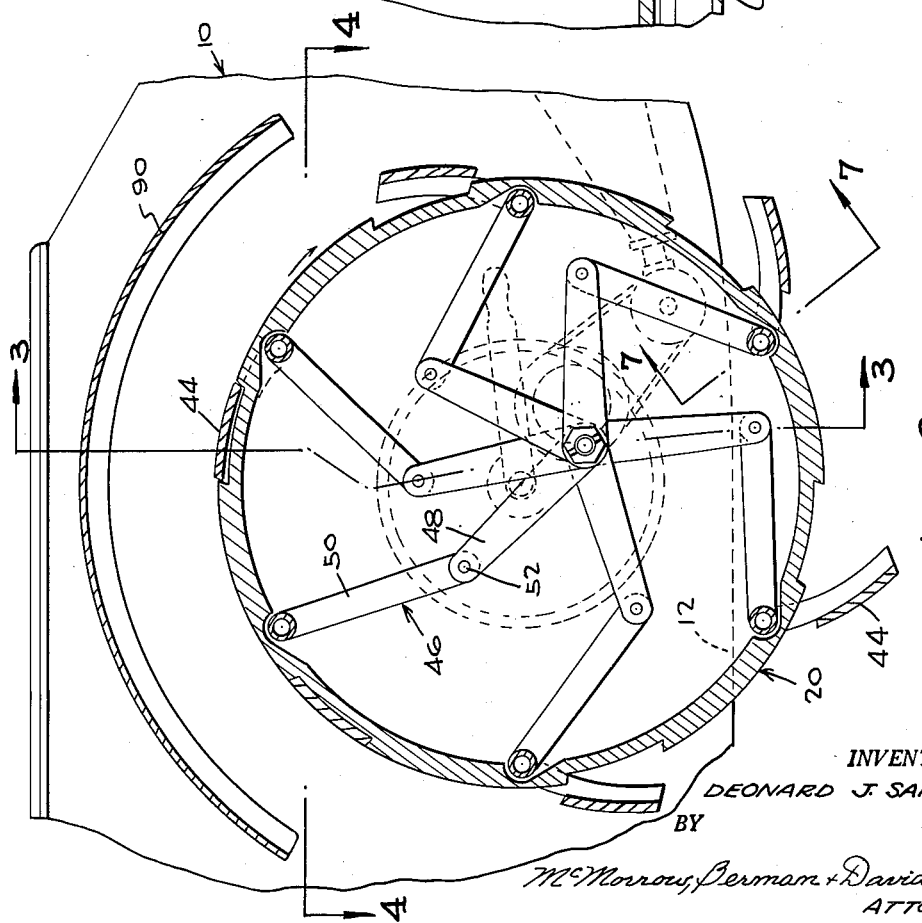

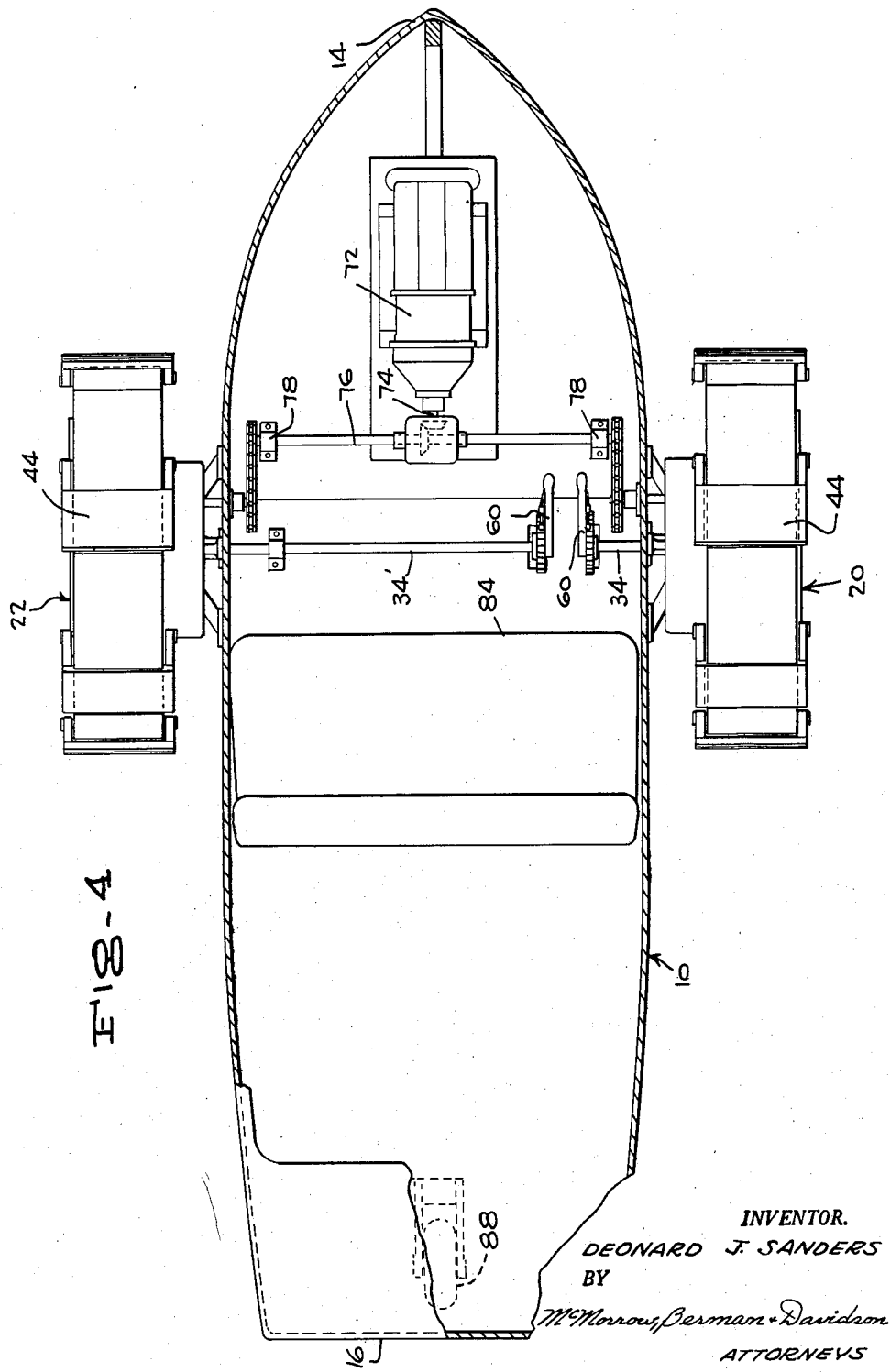

April 18, 1961  D. J. SANDERS  2,980,054
AMPHIBIOUS VEHICLE
Filed Dec. 18, 1959  4 Sheets-Sheet 4
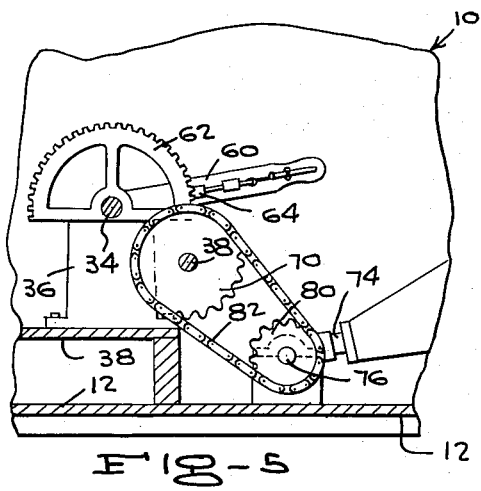
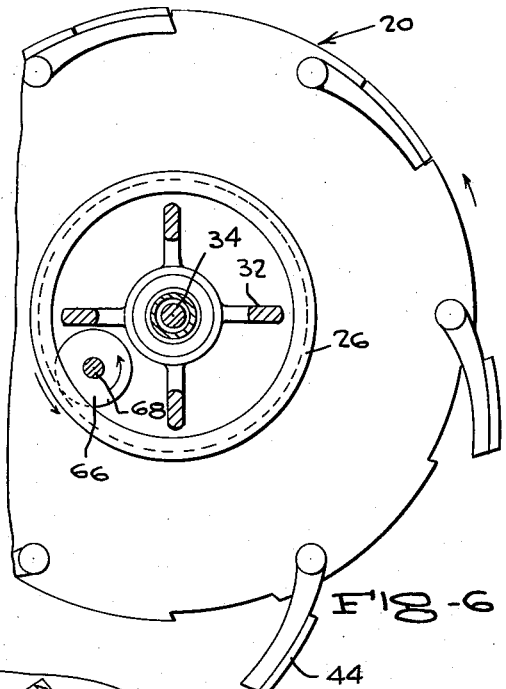
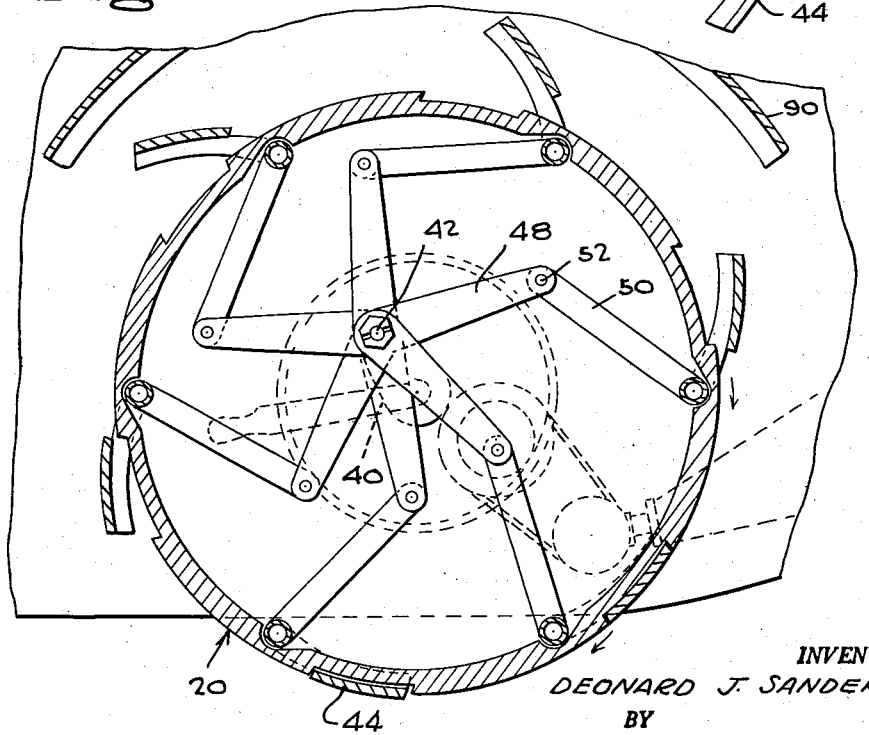
INVENTOR.
DEONARD J. SANDERS
BY
McMorrow, Berman + Davidson
ATTORNEYS United States Patent Office 2,980,054
Patented Apr. 18, 1961

2,980,054
AMPHIBIOUS VEHICLE
Deonard Joel Sanders, Rte. 1, Irwinton, Ga.
Filed Dec. 18, 1959, Ser. No. 860,427
6 Claims. (Cl. 115—1)

The present invention relates to an amphibious vehicle.
Vehicles have been previously proposed designed for travel on the surface of a body of water and for travel over the land. Few of such vehicles have met with commercial success for various reasons. Generally, the amphibious vehicles proposed have been cumbersome and difficult to steer when in the water. Some of the vehicles proposed also became stranded when partiallly out of the water and in mud or sand in which their wheels have no traction. Other vehicles proposed rode so deep in the water due to the cumbersome and heavy endless tracks provided for land travel that they were not seaworthy.

An object of the present invention is to provide an amphibious vehicle which lends itself to ease of steering when in the water, one which has means for digging itself out of sand or mud, and one which is efficient when in the water and completely seaworthy in all respects.

Another object of the present invention is to provide an amphibious vehicle which is converted from a vehicle for traveling over the surface of a body of water to a vehicle for traveling on a land surface with ease and facility, such conversion being made in a matter of seconds and at the will of the operator, one which will travel in deep or shallow water with equal efficiency, and one which is highly effective in action.

These and other objects and advantages of the present invention will be fully apparent from the following description when taken in conjunction with the annexed drawings, in which:

Figure 1 is an isometric view of the amphibious vehicle according to the present invention;

Figure 2 is a view on an enlarged scale, taken on the line 2—2 of Figure 1;

Figure 3 is a view taken on the line 3—3 of Figure 2;

Figure 4 is a view on a reduced scale, taken on the line 4—4 of Figure 2;

Figure 5 is a view taken on the line 5—5 of Figure 3;

Figure 6 is a view taken on the line 6—6 of Figure 3;

Figure 7 is a view on an enlarged scale, taken on the line 7—7 of Figure 2;

Figure 8 is a view on an enlarged scale, taken on the line 8—8 of Figure 3; and

Figure 9 is a view similar to Figure 2, showing the paddles in the position for travel over a land surface.

Referring in greater detail to the drawings in which like numerals indicate like parts throughout the several views, the amphibious vehicle of the present invention comprises a boat hull 10 having a bottom 12, a prow 14, and a stern 16.

Exteriorly of each side of the hull 10, intermediate the prow 14 and stern 16, is a horizontally disposed sleeve 18 about which is circumposed a rotatable wheel spaced from such sleeve and supported thereon. With reference to Figure 4, the wheel on the starboard side of the hull 10 is designated by the reference numeral 20 and the wheel on the port side of the hull 10 is designated by the reference numeral 22. As the wheels 20 and 22 are identical and their supporting structures are identical, they will be described with reference to wheel 20 for reasons of simplicity.

The wheel 20 comprises a hollow drum having an open front closed by a cover plate 24 removably secured thereto. On the inner face of the wheel 20 is a ring 26 circumposed about the sleeve 18. A stub sleeve 28 projects from the inner face of the wheel 20 and is rotatably mounted upon the sleeve 18 with a bearing structure 30 supporting the sleeve 28 on struts 32 which project from the side of the hull 10, as shown in Figure 3.

A driven rotatable shaft 34 extends through the sleeve 18 and has one end within the wheel 20 and the other end mounted in the upper end of the standard 36 which is bolted to a platform 38 spaced above and secured to the hull bottom 12.

A crank arm 40 is carried upon the end of the shaft 34 within the wheel 20 and a crank pin 42 is carried upon the free end of the crank arm 40.

A plurality of paddles 44 are arranged in spaced relation about the wheel 20 so as to straddle the periphery of the wheel 20 and a linkage, as at 46, connects each of the paddles 44 to the crank pin 42 so that each paddle 44 is operable to be successively projected outwardly of the periphery of the wheel 20 and is retracted to a position nested within the periphery of the wheel 20.

The linkage 46 embodies a pair of rigid bars 48 and 50 arranged in end to end overlapping relation with the overlapped end pivotally connected by a pivot pin 52.

As shown in Figures 3 and 8, the inner end of each of the bars 48 is rotatably mounted upon the pivot pin 52 by means of an appropriately dimensioned sleeve circumposed thereabout. The sleeves are of different diameters and lengths and one sleeve associated with the linkage 46 closest to the cover plate 24 is designated by the numeral 54.

The outer end of each of the bars 50 is fixedly secured to a hollow shaft 56 which is rotatably mounted in the wheel 20 adjacent the periphery thereof, as shown in Figure 7. Each shaft 56 is secured to the adjacent paddle 44 by means of bolts 58 at each end thereof.

On the end of the shaft 34 remote from the bars 50 is an actuating arm 60 constituting actuatable means operatively connected to the shaft 34 for effecting the rotation of the shaft 34. A ratchet segment 62 is carried on the upper end of the standard 36 adjacent the arm 60 and a releasable dog 64 is carried on the arm 60 for securing the arm 60 in any position of adjusted movement through 180 degrees of travel relative to the segment 62, as shown in Figure 5.

Within the ring 26 on the inner face of the wheel 20 is a drive roller 66 carried on one end of a drive shaft 68 which extends into the interior of the hull 10. The roller 66 is in frictional engagement within the periphery of the ring 26 and drives the same when rotated.

The inner end of the drive shaft 68 carries a sprocket 70. An engine 72 secured to the hull bottom 12 forwardly of the wheels 20 and 22 has its output shaft 74 drivably connected to a cross shaft 76 which has its end portions journaled in bearing blocks 78 mounted on the hull bottom 12. A sprocket 80 on one end of the cross shaft 76 is drivably connected to the sprocket 70 by means of a drive chain 82.

The drive means for the wheel 22 is identical and the only difference between the above-described components of the wheel 22 and the wheel 20 is that the shaft 34' is longer so that the actuating arm 60 is positioned adjacent the previously described actuating arm so that both of the arms 60 are within the reach of an operator of the boat when seated upon the seat 84 thereof.

The periphery of each of the wheels 20 and 22 is provided with a recess 86 adjacent each of the paddles 44 and into which the paddle 44 moves when the linkage bars 48 and 50 are shifted to the extended position, as shown on the upper side of the wheel 20 in Figure 2.

A caster wheel 88 beneath the stern 16 of the boat hull 10 supports the stern end of the boat hull for traveling movement over a ground surface.

A shield 90 extends over each of the wheels 20 and 22 and projects outwardly of the adjacent side of the hull 10 for keeping water sprayed out of the interior of the hull 10.

In operation, the operator of the boat of the present invention, when seated on the seat 84, may move both of the arms 60 together or one at a time. When the vehicle is to travel on land, the arms 60 are moved to the position in which the crank pin 42 is above the axis of rotation of the wheels 20 and 22, as shown in Figure 9. This presents a solid surface to the ground for rolling movement thereover. When it is desired to travel over the surface of a body of water, the arms 60 are moved to the opposite position, shifting the crank pin 42 to the position shown in Figure 2 below the axis of rotation of the wheels 20 and 22. In this position, as each wheel 20 and 22 rotates, the paddles 44 are extended in turn in a position to work against the water and to cause forward motion of that side of the boat hull 10.

To execute a turn, the operator has only to shift one of the actuating arms 60 and to extend or retract the paddles 44 on one side of the hull 10 in order that one wheel has more traction than the other and to therefore execute a turn on the surface of a body of water.

When the vehicle becomes stranded in sand or mud, it is only necessary to partially lower the paddles 44 to provide gripping means for better traction in such substance.

What is claimed is:

1. In an amphibious vehicle, a propulsion means comprising a rotatable wheel, a plurality of paddles arranged in spaced relation about said wheel so as to straddle the periphery thereof, a driven shaft, a crank arm carried by said shaft, a crank pin on said crank arm, and a linkage connecting each of said paddles to said crank pin, said paddles being operable to be successively projected outwardly of the periphery of said wheel and retracted to a position nested within the periphery of said wheel.

2. In an amphibious vehicle, a propulsion means comprising a rotatable wheel, a plurality of paddles arranged in spaced relation about said wheel so as to straddle the periphery thereof, a driven shaft, a crank arm carried by said shaft, a crank pin on said crank arm, and a linkage connecting each of said paddles to said crank pin, said linkage embodying a pair of rigid bars arranged in end to end overlapping relation and having the overlapped ends pivotally connected together with the other end of one of said bars being attached to said crank pin and the other end of the other of said bars being attached to the adjacent paddle, said paddles being operable to be successively projected outwardly of the periphery of said wheel and retracted to a position nested within the periphery of said wheel.

3. In an amphibious vehicle, a propulsion means comprising a horizontally disposed sleeve, a rotatable wheel circumposed about and spaced from said sleeve and supported thereon, a plurality of paddles arranged in spaced relation about said wheel so as to straddle the periphery thereof, a shaft arranged axially of and extending through said sleeve and rotatable in opposite directions, a crank arm carried by said shaft, a crank pin on said crank arm, and a linkage connecting each of said paddles to said crank pin, said paddles being operable to be successively projected outwardly of the periphery of said wheel responsive to the rotation of said shaft in one direction and retracted to a position nested within the periphery of said wheel responsive to rotation of said shaft in the other direction.

4. In an amphibious vehicle, a propulsion means comprising a horizontally disposed sleeve, a rotatable wheel circumposed about and spaced from said sleeve and supported thereon, a plurality of paddles arranged in spaced relation about said wheel so as to straddle the periphery thereof, a shaft arranged axially of and extending through said sleeve and rotatable in opposite directions, a crank arm carried by said shaft, a crank pin on said crank arm, a linkage connecting each of said paddles to said crank pin, said paddles being operable to be successively projected outwardly of the periphery of said wheel responsive to the rotation of said shaft in one direction and retracted to a position nested within the periphery of said wheel responsive to rotation of said shaft in the other direction, and hand actuable means operatively connected to said shaft for effecting the rotation of the latter.

5. In an amphibious vehicle, a propulsion means comprising a horizontally disposed sleeve, a rotatable wheel circumposed about and spaced from said sleeve and supported thereon, a plurality of paddles arranged in spaced relation about said wheel so as to straddle the periphery thereof, a shaft arranged axially of and extending through said sleeve and rotatable in opposite directions, a crank arm carried by said shaft, a crank pin on said crank arm, a linkage connecting each of said paddles to said crank pin, said linkage embodying a pair of rigid bars arranged in end to end overlapping relation and having the overlapped ends pivotally connected together with the other end of one of said bars being attached to said crank pin and the other end of the other of said bars being attached to the adjacent paddle, said paddles being operable to be successively projected outwardly of the periphery of said wheel responsive to the rotation of said shaft in one direction and retracted to a position nested within the periphery of said wheel responsive to rotation of said shaft in the other direction, and hand actuable means operatively connected to said shaft for effecting the rotation of the latter.

6. An amphibious vehicle comprising a hull including a prow and a stern, a horizontally disposed sleeve positioned exteriorly of each side of said hull intermediate said prow and stern, a rotatable wheel circumposed about and spaced from each of said sleeves and supported thereon, a plurality of paddles arranged in spaced relation about each of said wheels so as to straddle the periphery thereof, a shaft arranged axially of and extending through each of said sleeves and rotatable in opposite directions, a crank arm carried by each of said shafts, a crank pin on each of said crank arms, a linkage connecting each of said paddles to said crank pin, said paddles being operable to be successively projected outwardly of the periphery of said wheels responsive to the rotation of said shaft in one direction and retracted to a position nested within the periphery of said wheels responsive to rotation of said shaft in the other direction, and hand actuable means operatively connected to said shaft for effecting the rotation of the latter.

References Cited in the file of this patent

UNITED STATES PATENTS

| 440,234 | Schaffers | Nov. 11, 1890 |
| 2,362,541 | De Lancey | Nov. 14, 1944 |